US005778026A

United States Patent [19]
Zak

[11] Patent Number: 5,778,026
[45] Date of Patent: Jul. 7, 1998

[54] REDUCING ELECTRICAL POWER CONSUMPTION IN A RADIO TRANSCEIVER BY DE-ENERGIZING SELECTED COMPONENTS WHEN SPEECH IS NOT PRESENT

[75] Inventor: Robert Allen Zak, Raleigh, N.C.

[73] Assignee: Ericsson Inc., Research Triangle Park, N.C.

[21] Appl. No.: 426,407

[22] Filed: Apr. 21, 1995

[51] Int. Cl.$^6$ ..................................................... H04B 1/38
[52] U.S. Cl. ...................... 315/219; 455/127; 455/343; 455/574
[58] Field of Search ..................... 375/220, 219, 375/312, 224, 256; 379/58, 59, 63, 61, 57; 455/33.1, 34.1, 34.2, 31.1, 54.1, 122, 125, 343, 54.2, 68, 69, 403, 422, 423, 574, 127; 395/2.42, 2.71, 2.73, 2.67, 2.1, 2.28; 381/58, 51, 36

[56] References Cited

U.S. PATENT DOCUMENTS

| | | | |
|---|---|---|---|
| 4,631,496 | 12/1986 | Borras et al. | 331/1 A |
| 4,727,568 | 2/1988 | Morishima | 379/58 |
| 5,031,231 | 7/1991 | Miyazaki | 455/54.2 |
| 5,054,052 | 10/1991 | Nonami | 379/57 |
| 5,117,502 | 5/1992 | Onoda et al. | 455/33.1 |
| 5,146,610 | 9/1992 | Longshore et al. | 455/35.1 |
| 5,175,871 | 12/1992 | Kunkel | 455/69 |
| 5,179,724 | 1/1993 | Lindoff | 455/76 |
| 5,193,223 | 3/1993 | Walczak et al. | 455/126 |
| 5,203,020 | 4/1993 | Sato et al. | 455/68 |
| 5,278,866 | 1/1994 | Nonami | 375/227 |
| 5,327,519 | 7/1994 | Haggvist et al. | 395/2.28 |
| 5,410,632 | 4/1995 | Hong et al. | 395/2.42 |

OTHER PUBLICATIONS

I.A. Gerson and M.A. Jasuik, "Vector Sum Excited Linear Prediction (VSELP) Speech Coding At 8 KBPS," *IEEE*, CH2847-Feb. 1990/0000-0461, pp. 461-464, 1990.

Telecommunication Industry Association Interim Specification, IS-136.2, pp. 29-71, Nov. 14, 1994.

"Speech Coding for Personal Wireless Communications," *DSP & Multimedia Technology*, pp. 42-43, vol. 3, No. 7, Jul. 1994.

Primary Examiner—Wellington Chin
Assistant Examiner—William Luther
Attorney, Agent, or Firm—Charles L. Moore

[57] ABSTRACT

The present invention provides a battery-powered radio transceiver for transmitting and receiving digital signals and method of operation for reducing electrical power consumption and thereby improving battery life between recharges. The radio transceiver includes an operator interface and a transmitter, electrically connected to a microphone in the operator interface, to convert speech signals into digital radio frequency (RF) signals for transmission. A receiver is electrically connected to a speaker in the operator interface to receive digital RF signals and to convert the RF signals into audio signals from the speaker. A microprocessor electrically connected to the operator interface, the transmitter and the receiver controls the operation of these components in processing telephone calls. An electrical storage battery is electrically connected to the microprocessor to supply electrical power to the microprocessor, the operator interface, the transmitter and the receiver via the microprocessor. An antenna assembly is connected to the transmitter and the receiver for transmitting and receiving the RF signals. The transmitter comprises a digital signal processor which is programmed to de-energize at least some of its components and to generate an artificial noise signal for transmission when speech is not being received by the microphone.

22 Claims, 4 Drawing Sheets

5,778,026

REDUCING ELECTRICAL POWER CONSUMPTION IN A RADIO TRANSCEIVER BY DE-ENERGIZING SELECTED COMPONENTS WHEN SPEECH IS NOT PRESENT

BACKGROUND OF THE INVENTION

1. Field of the Invention

The present invention relates generally to radio frequency (RF) communications and more particularly to a battery-powered radio transceiver, cellular telephone or the like for transmitting and receiving digital signals with improved battery life and method utilized by the transceiver or cellular telephone for reducing electrical power consumption to prolong battery life.

2. Description of the Prior Art

Discontinuous transmission (DTX) of signals from the subscriber units (mobile and portable telephone terminals) to serving base stations has been employed in digital cellular communications systems for many years and such operation is described in specifications for systems such as American Digital Cellular (ADC) IS-54B, Global System for Mobile Communications (GSM), and Advanced Mobile Phone System (AMPS). Not all Time Division Multiple Access (TDMA) cellular telephone systems, however, allow the subscriber units (mobile and portable telephone terminals) to operate in a DTX mode when two-way communications or conversations are not in progress, or, in other words, when the subscriber unit is idle.

One reason for non-DTX operation in some systems is that extra message traffic is required between the base station and the subscriber unit to command the subscriber unit to turn its transmitter on and off to verify that the communications link is still present between the base station and the unit. Another reason for continuous transmission between the base station and subscriber units is that the base station equipment must be capable of generating comfort noise for transmission to the subscriber units or terminals to avoid unpleasant discontinuities in the speech pattern, such as a transition from background noise to silence in the uplink (terminal-to-base station) audio signal when the terminal ceases to transmit speech. The base station equipment requires a continuous signal from the subscriber unit or terminal to generate the return comfort noise. Accordingly, a primary disadvantage of non-DTX systems relative to DTX systems is that the subscriber terminal is required to send a continuous signal to the base station which results in increased power consumption and reduced battery life.

Therefore, a need exists for reducing the power consumption in the terminals operating in non-DTX systems while continuing to transmit noise or other signals to the base station when regular speech or other control signals are not being transmitted to the base station.

It is accordingly a primary object of the present invention to provide a novel battery-operated radio transceiver and method of operation which is not subject to the foregoing disadvantages.

It is another object of the present invention to provide a novel radio transceiver and method of operation with reduced electrical power consumption and prolonged battery life.

It is a further object of the present invention to provide a novel radio transceiver and method of operation wherein at least some components of the speech encoder of the transceiver are de-energized when there is no uplink speech present to reduce power consumption and increase battery life.

These and other objects of the present invention, together with the features and advantages thereof, will become apparent from the following specification when read with the accompanying drawings in which like reference numerals refer to like elements.

SUMMARY OF THE INVENTION

In accordance with the present invention, a method for reducing electrical power consumption in a radio transceiver capable of transmitting and receiving digital signals divided into frames, each containing digital parameter codes characterizing analog speech and noise signals, includes the steps of determining if speech is present; setting each of the digital parameter codes to at least one of determined or selected values for a predetermined number of frames when speech is not present; transmitting the determined or selected parameter code values, which define an artificial noise signal, to a base station when speech is not present; and substantially reducing electrical power consumption to a digital signal processor of the radio transceiver because at least some components of the transceiver are not required to process signals and may be de-energized when transmitting the artificial noise signal.

In further accordance with the present invention, a battery-powered radio transceiver for transmitting and receiving digital signals with improved battery life includes an operator interface and a transmitter electrically connected to a microphone in the operator interface to convert speech signals into digital radio frequency (RF) signals for transmission. A receiver is electrically connected to a speaker and the operator interface to receive digital RF signals and to convert the RF signals into audio signals which are in turn transmitted to an operator from the speaker. A microprocessor is electrically connected to the operator interface, the transmitter and the receiver to control operation of each of these units. An electrical storage battery is electrically connected to the microprocessor to supply electrical power to the microprocessor, the operator interface, the transmitter and the receiver via the microprocessor. An antenna assembly is connected, respectively, to the transmitter and receiver for transmitting and receiving the digital RF signals and the transmitter includes a digital signal processor which is programmed to de-energize at least some of its components and to generate an artificial noise signal for transmission when speech is not being received by the microphone.

DETAILED DESCRIPTION OF THE PREFERRED EMBODIMENTS

Figure 1:
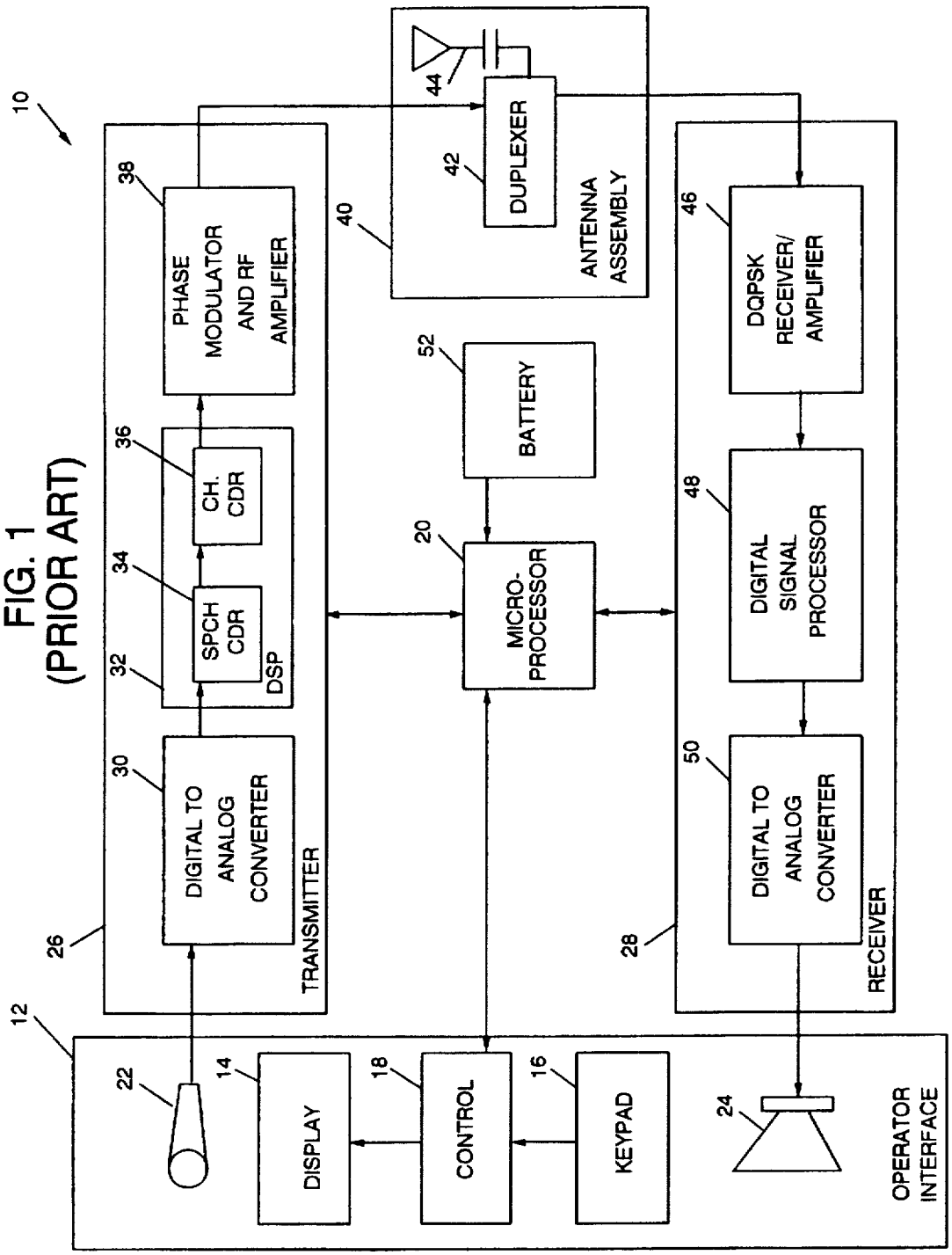
FIG. 1 is a block schematic diagram of a radio transceiver or cellular telephone capable of transmitting and receiving digital signals.

In order to best describe the present invention, a brief description of an example of a radio transceiver, cellular telephone or the like and its operation are warranted. FIG. 1 is a block schematic diagram of a typical radio transceiver 10, cellular telephone or the like capable of transmitting and receiving digital signals. The radio transceiver 10 in FIG. 1 could also be a dual-mode cellular telephone, i.e., capable of transmitting and receiving both analog and digital signals; however, only the digital transmit and receive transmission paths are shown for purposes of clarity since the present invention is utilized when the transceiver 10 is operating in a digital system which does not permit operation of the cellular telephone 10 in the discontinuous mode (DTX). The transceiver 10 includes an operator interface 12 containing a display 14 to provide visual signals to the subscriber or user as to the status of the transceiver 10 and a keypad 16 which permits the subscriber to communicate commands to the transceiver 10. A control unit 18 is provided to interface between the display 14 and keypad 16 and a microprocessor 20 controls operation of the transceiver 10 under a stored program. The microprocessor 20 encodes and decodes control signals and performs calls processing procedures. The operator interface 12 also contains a microphone 22 and a speaker 24. The microphone 22 receives audio signals from the user and converts the audio signals to analog signals for transmission to a transmitter 26 of the transceiver 10. The speaker 24 receives analog signals from a receiver 28 of the subscriber unit 10 and converts the analog signals to audio signals which can be understood by the user.

The microphone 22 is electrically connected to an analog-to-digital converter 30 in the transmitter 26. The analog-to-digital converter 30 changes the analog signals into a 104 kilobit per second (kbps) pulse-coded modulation (PCM) digital form. Eight thousand (8 k) PCM samples are taken of the signal per second with 13 bits per sample which translates into 104 kbps. The analog-to-digital converter 30 is electrically connected to a digital signal processor 32 in transmitter section 26. The digital signal processor (DSP) 32 contains a speech coder 34 and a channel coder 36. The speech coder 34 characterizes and compresses the 104 kbps digital data into 7.95 kbps, and the channel coder 36 inserts error detection, error correction and signaling information. The digital signal processor 32 is electrically connected to a phase modulator and RF amplifier 38 which are shown as a single block in FIG. 1 for purposes of clarity. The modulator may be a II/4 differential quadrature phase shift keying (DQPSK) modulator which changes the digital data into proportional phase shift changes in the radio frequency (RF) carrier. The linear RF amplifier then boosts the output of the modulator for transmission. The RF amplifier 38 of the transmitter 26 is electrically connected to an antenna assembly 40 which includes a duplexer 42 and an antenna 44. The antenna assembly 40 matches the impedance of the transmitter 26 and receiver 28 in order to permit transmission and reception of digital signals. The duplexer 42 receives the encoded digital signals from the RF amplifier 38 and is coupled to the antenna 44 for transmission of the digital signals to a base station.

The duplexer 42 of the antenna assembly 40 is connected to a DQPSK receiver/amplifier 46 of the receiver unit 28. Digital signals received by the antenna 44 are then transferred by the duplexer 42 to the DQPSK receiver/amplifier 46 which boosts the low level RF digital signal to a level appropriate for input into another digital signal processor 48 in the receiver 28. The digital signal processor 48 includes a demodulator which converts proportional frequency (phase) changes into digital data and an equalizer section adjusts the receiver section 42 to compensate for the phase and amplitude distortions created by the transmission path of the radio signal. A channel decoder separates signaling commands from speech data and detects and corrects bit errors and a speech decoder converts the compressed 8 kbps data back into 104 kbps PCM digital data. The digital signal processor 48 is electrically connected to another digital-to-analog converter 50 which converts the digital speech data into its original analog signals for transmission to the speaker 24.

The microprocessor 20 operating under stored program control coordinates the operation of the transmitter 26 and the receiver 28. The microprocessor 20 inserts and extracts control messages, changes physical parameters, such as channel frequencies, and communicates with the operator interface 12 to permit the subscriber to command and control operation of the transceiver 10. The microprocessor 20 is powered by a battery 48 which also supplies power to the operator interface 12, the transmitter 26 and the receiver 28.

The speech codec 34 may be a class of speech coder known as a codebook-excited linear prediction (CELP) coder, such as a vector-sum excited linear prediction (VSELP) speech codec as described in *Telecommunications Industry Association (TIA) Interim Specification IS-136.2*, Nov. 14, 1994, pages 29–71. The present invention will be described with reference to a VSELP codec; however, those skilled in the art will recognize that the principles described could easily be adapted to any type speech codec.

Figure 2:
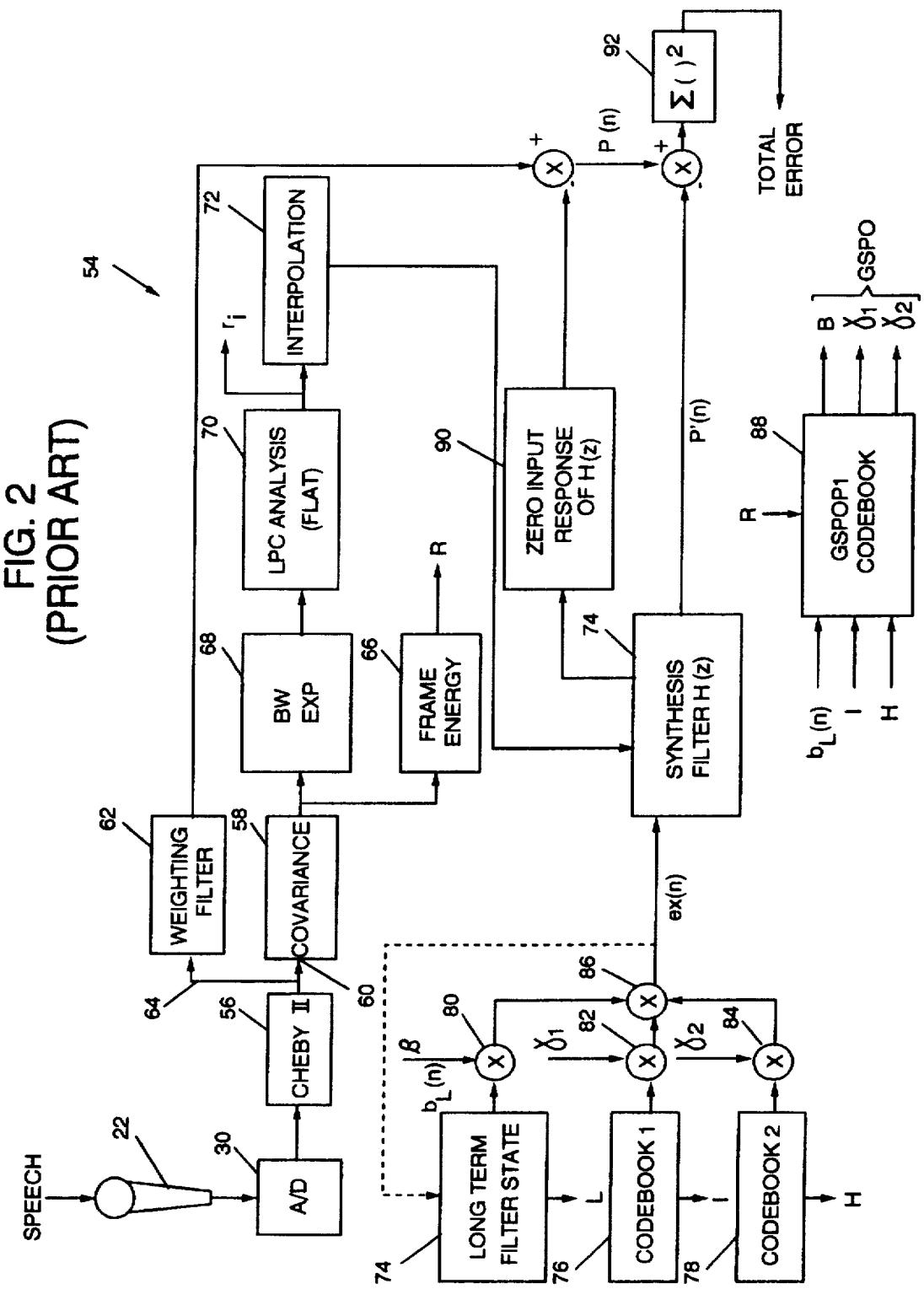
FIG. 2 is a block schematic diagram of a vector-sum excited linear prediction (VSELP) speech encoder.

A VSELP encoder 54 is illustrated in FIG. 2 in block diagram form and will be described briefly for purposes of understanding the present invention. The VSELP 54 basically converts the analog speech signals received by microphone 22 into digital parameter codes which can be encoded, modulated, amplified and transmitted by the antenna assembly 40. Speech received by microphone 22 is converted from an analog signal to a digital signal by A/D converter 30 (see also FIG. 1). The digital signal from the A/D converter 30 is passed through a fourth order Chebyshev type II high pass filter 56 which removes low-frequency noise from the signal. The output of the Chebyshev filter 56 is then passed to a covariance unit 58 along one transmission path 60 and to a weighting filter 62 along another transmission path 64. The covariance unit 58 performs the function of computing the autocorrelation function of the audio frame. From the output signal of the covariance 58, one of the digital parameter codes, the frame energy R, is determined from a processing unit 66 which computes and quantizes the energy of the frame. The output of the covariance 58 is also connected to a bandwidth (BW) expander 68. A linear prediction coding (LPC) analysis 70 is performed on the output signal of the BW expander 68 to provide the LPC reflection coefficients $r_i$. The LPC analysis 70 is a fixed point variance lattice algorithm, FLAT, which is described in more detail in TIA Interim Specification IS-136.2. There are ten reflection coefficients $r_i$ which represent the short-term predictor parameters. Each of the ten reflection coefficients $r_i$ are quantized by a separate codebook as described in TIA Interim Specification IS-136.2 and the quantized reflection coefficients for the first three subframes of each frame of digital speech are interpolated 72 and transmitted with the fourth subframe of uninterpolated coefficients to a synthesis filter H(z) 74 which is electrically connected to the interpolator 72.

Figure 3:
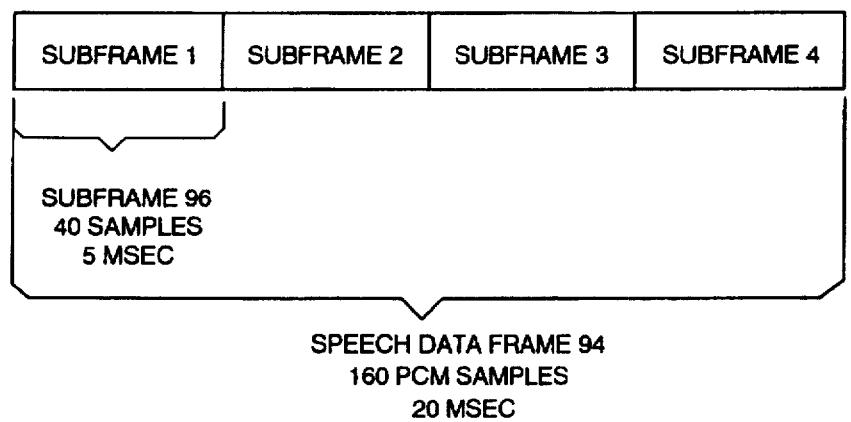
FIG. 3 is a representation of a speech data frame and subframes of a TDMA digital signal.

The digital parameter codes also include a long-term predictor lag (L), a first codebook codeword (I), and a second codebook codeword (H). There is an L, I and H parameter for each of the four subframes of the TDMA speech frame (FIG. 3). The parameters L, I and H are selected to minimize the total weighted error 92, i.e., the parameters are selected so that the digital parameter codes represent as closely as possible the digitally encoded speech signal.

The linear predictor lag (L) is derived from a long-term filter 74 and codewords I and H are, respectively, selected from codebooks 1 and 2 (76 and 78), to minimize the total error as described in more detail in TIA Interim Specification IS-136.2. Each of the outputs of the long-term filter 74, codebook 1 (76) and codebook 2 (78) are, respectively, multiplied by excitation gains β, γ₁ and γ₂ by multipliers 80, 82 and 84 and added by summer 86 to provide an excitation signal $e_x(n)$. The excitation gains β, γ₁ and γ₂ are determined from a GSP0P1 codebook 88 as a function of the output of the long-term filter state 74 $b_L(n)$ and codewords I and H and the frame energy R as described in more detail in TIA Interim Specification IS-136.2.

The excitation signal $e_x(n)$, is inputted into the synthesis filter 74 with the quantized reflection coefficients from the interpolation 72. A zero input response 90 of the synthesis filter H(z) is subtracted from the weighted digital signal from weighting filter 62 to provide a resultant signal p(n). The output signal of the synthesis filter 74, p'(n), is subtracted from p(n) where $0 \leq n \leq N-1$ and N equals the subframe length of 40 samples. Each of the differences between p(n) and p'(n) are summed from n equals zero to n equals N−1 and squared to provide the total weighted error squared for each subframe.

Table 1 illustrates the allocation of bits per frame for each of the parameter codes determined from the VSELP 54. FIG. 3 illustrates a TDMA speech frame 94 which contains 160 PCM samples (13 bits each sample) and is 20 milliseconds in duration. The speech frame is subdivided into four subframes 96 which each contain 40 samples and are 5 milliseconds in duration or length. All speech received by microphone 22 is accordingly sampled and divided into frames 94 by the transmitter 26 according to the protocol illustrated in FIG. 3.

TABLE 1

ALLOCATION OF TDMA SPEECH FRAME BITS

| SYMBOL | PARAMETER CODE | BITS/ FRAME | DEFINITION |
|---|---|---|---|
| R | R0 | 5 | Frame Energy |
| $r_1$ | LPC1 | 6 | 1st reflection coefficient |
| $r_2$ | LPC2 | 5 | 2nd reflection coefficient |
| $r_3$ | LPC3 | 5 | 3rd reflection coefficient |
| $r_4$ | LPC4 | 4 | 4th reflection coefficient |
| $r_5$ | LPC5 | 4 | 5th reflection coefficient |
| $r_6$ | LPC6 | 3 | 6th reflection coefficient |
| $r_7$ | LPC7 | 3 | 7th reflection coefficient |
| $r_8$ | LPC8 | 3 | 8th reflection coefficient |
| $r_9$ | LPC9 | 3 | 9th reflection coefficient |
| $r_{10}$ | LPC10 | 2 | 10th reflection coefficient |
| $L_1$ | LAG_1 | 7 | lag for first subframe |
| $L_2$ | LAG_2 | 7 | lag for second subframe |
| $L_3$ | LAG_3 | 7 | lag for third subframe |
| L4 | LAG_4 | 7 | lag for fourth subframe |
| $I_1$ | CODE1_1 | 7 | 1st codebook codeword for 1st subframe |
| $I_2$ | CODE1_2 | 7 | 1st codebook codeword for 2nd subframe |
| $I_3$ | CODE1_3 | 7 | 1st codebook codeword for 3rd subframe |
| $I_4$ | CODE1_4 | 7 | 1st codebook codeword for 4th subframe |
| $H_1$ | CODE2_1 | 7 | 2nd codebook codeword for 1st subframe |

TABLE 1-continued

ALLOCATION OF TDMA SPEECH FRAME BITS

| SYMBOL | PARAMETER CODE | BITS/ FRAME | DEFINITION |
|---|---|---|---|
| $H_2$ | CODE2_2 | 7 | 2nd codebook codeword for 2nd subframe |
| $H_3$ | CODE2_3 | 7 | 2nd codebook codeword for 3rd subframe |
| $H_4$ | CODE2_4 | 7 | 2nd codebook codeword for 4th subframe |
| β, γ₁, γ₂ | GSPO_1 | 8 | gains for first subframe |
| β, γ₁, γ₂ | GSPO_2 | 8 | gains for second subframe |
| β, γ₁, γ₂ | GSPO_3 | 8 | gains for third subframe |
| β, γ₁, γ₂ | GSPO_4 | 8 | gains for fourth subframe |

Figure 4:
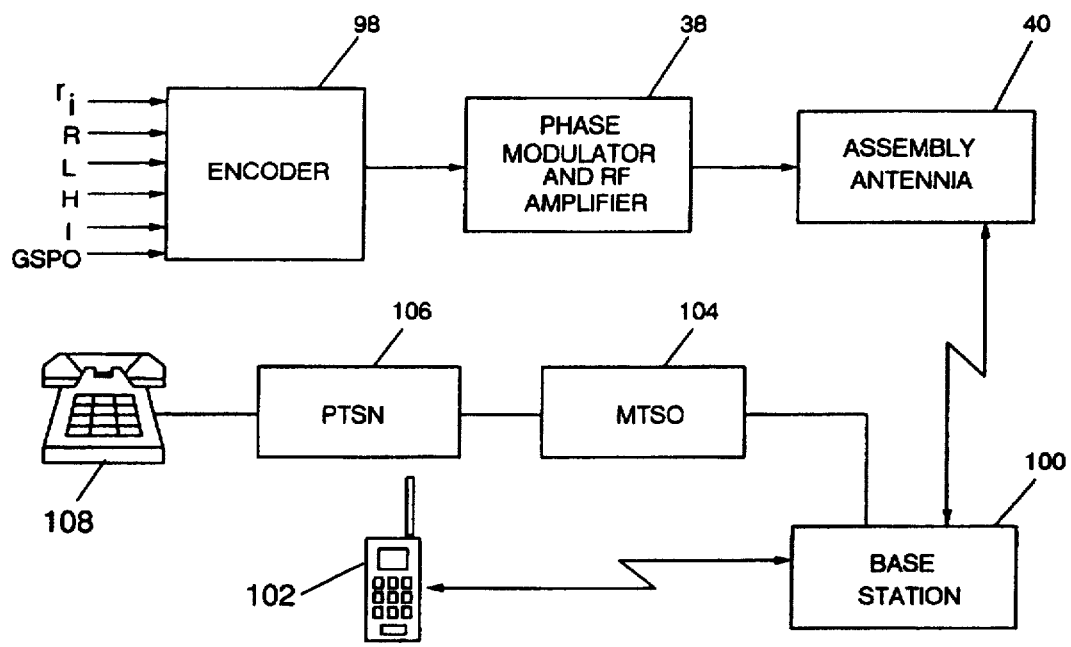
FIG. 4 is a block schematic diagram showing communications between two subscriber or transceiver units via a base station in a RF communications or cellular telephone system.

Referring to FIG. 4, the digital parameter codes ($r_i$, R, L, I, H and GSP0) determined by the VSELP 54 are inputted into an encoder 98 in the digital signal processor 32 (FIG. 1) to put the codes into proper form for modulation by phase modulator 38 and transmission by the antenna assembly 40 to a base station 100 which, during a call, retransmits the signal to another subscriber unit 102 or to a mobile telephone switching office (MTSO) 104 which in turn may switch the signal to another base station or to the public telephone switching network (PTSN) 106 and out to a wireline subscriber 108.

Figure 5:
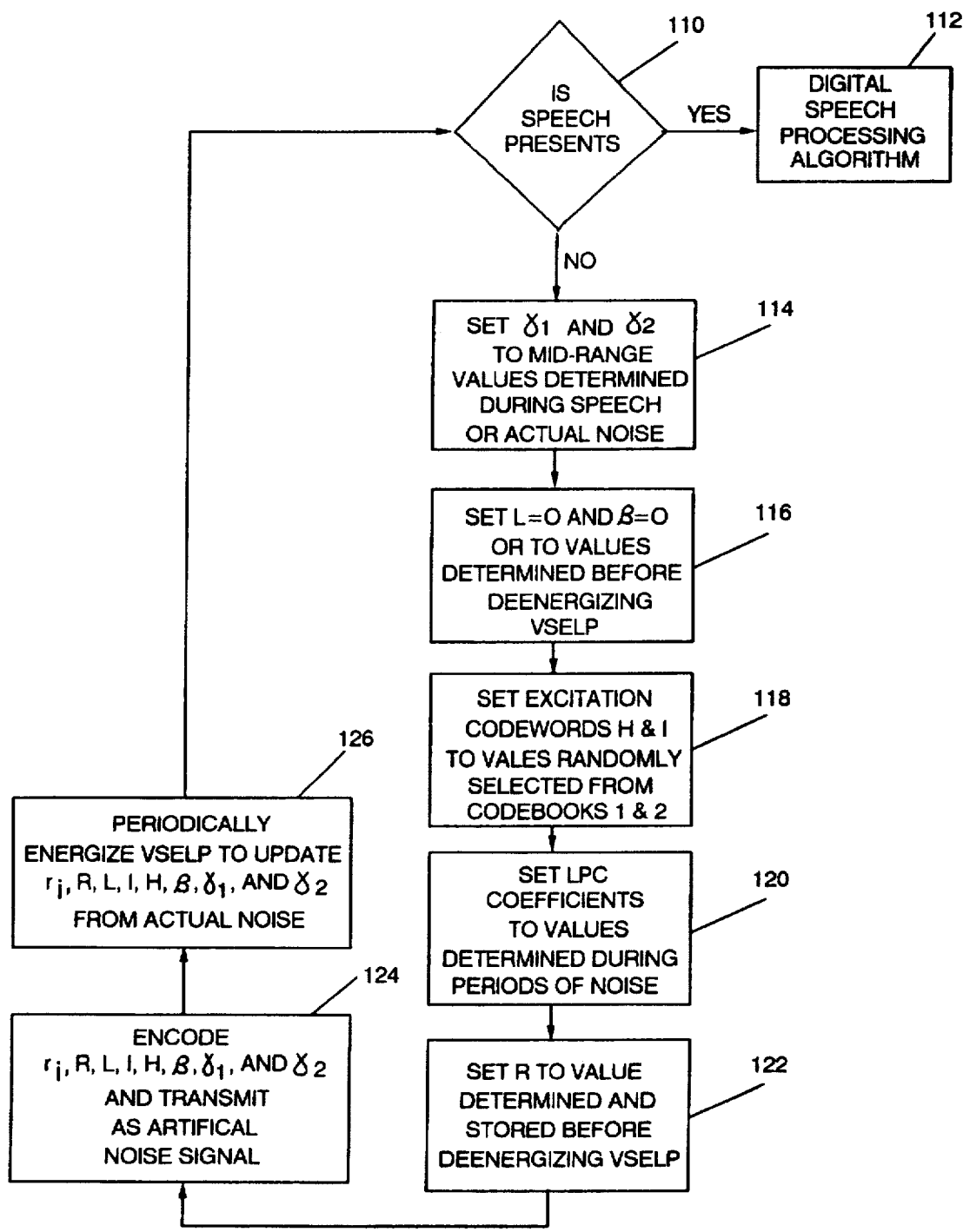
FIG. 5 is a flow graph of the method of reducing electrical power consumption in a radio transceiver or cellular telephone in accordance with the present invention.

Referring to FIG. 5, in accordance with the present invention, the digital signal processor 32 is programmed to determine whether speech is present, decision block 110, and if so, the digital signal processor 32 goes through the normal digital speech processing algorithm, block 112 to determine the digital parameter codes characteristic of the speech signals. If speech is not present, each of the digital parameter codes are set to either a determined or selected value to define an artificial noise signal which is transmitted to a base station in a non-DTX cellular telephone system. Portions of, or all of the VSELP 54 may then be de-energized when the radio transceiver 10 is transmitting the artificial noise signal to conserve battery power. When speech is not present, the excitation gains γ₁ and γ₂ may be set to their midrange values which are determined during actual processing of speech signals and stored or from actual noise before de-energizing all or portions of the VSELP 54, as indicated by block 114 in FIG. 5. The long-term pitch predictor lag, L, and the long-term excitation gain β may each be set to zero or to values determined and stored from actual speech or from noise processing in the digital signal processor 32 before de-energizing all or parts of the VSELP 54, block 116. As indicated by block 118, the excitation codewords H and I are set to randomly selected values from codebooks 1 (76) and 2 (78) and the LPC reflection coefficients $r_i$ may be set to values determined and stored during periods of actual processing of noise signals, block 120. In block 122, the frame energy R may be set to an average value which is determined and stored from the processing of actual speech or from actual noise signals before the VSELP 54 is de-energized. The level of background noise may be estimated initially when speech is not present and the frame energy R may be determined and stored from this background noise. The frame energy R is then set to this stored value for transmitting the artificial noise signal when speech is not present.

These determined or selected values for the digital parameter codes are encoded by encoder 98 and transmitted to the base station 100 (FIG. 4) as an artificial signal when speech is not present (block 124, FIG. 5) so as to maintain a continuous communications link as required in non-DTX TDMA cellular telephone systems or other type radio communication systems requiring a continuous signal.

In accordance with the present invention, after a predetermined number of frames 94 (FIG. 3), the de-energized components of the VSELP 54 may be re-energized for a predetermined time period to update any of the digital code parameters from actual noise present in the radio transceiver 10 (block 126, FIG. 5). The digital parameter codes may thus be periodically updated to revise the artificial noise signal based on actual noise present in the transceiver 10 by re-energizing the components of the VSELP 54, until speech is again detected by the digital signal processor 32 (block 110).

While the present invention has been described with respect to a VSELP codec, those skilled in the art will recognize that the present invention is also applicable to any type speech codec and that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is merely for purposes of providing a full and enabling disclosure of the invention. Accordingly, it is intended that the invention be limited only by the spirit and scope of the claims appended hereto.

What is claimed is:

1. A method for reducing electrical power consumption in a radio transceiver capable of transmitting and receiving digital signals which are divided into frames, each frame containing digital parameter codes characterizing analog speech signals and analog noise signals, said method comprising the steps of:
   (a) determining if the analog speech signals are present;
   (b) setting each of the digital parameter codes to at least one of determined or selected values for a predetermined number of frames when the analog speech signals are not present;
   (c) transmitting the determined or selected parameter code values, defining an artificial noise signal, to a base station when the analog speech signals are not present; and
   (d) reducing electrical power supplied to a digital signal processor of the radio transceiver when transmitting the artificial noise signal.

2. The method of claim 1, wherein step (d) comprises the step of de-energizing at least some selected components of a speech encoder of the digital signal processor.

3. The method of claim 2, wherein the digital parameter codes comprise a frame energy R, a set of excitation codewords H, I, a set of excitation gains $\beta, \gamma_1, \gamma_2$, a set of pitch predictor lag parameters L, and a set of linear predictive coding coefficients $r_i$, and wherein step (b) comprises the steps of:
   determining and storing values for 'R', 'H', 'I', '$\beta$', '$\gamma_1$', '$\gamma_2$', 'L' and '$r_i$' from actual speech or actual noise before de-energizing at least some selected components of the speech encoder; and
   setting 'R', 'H', 'I', '$\beta$', '$\gamma_1$', '$\gamma_2$', 'L' and '$r_i$' to the values stored for transmitting the artificial noise signal when analog speech signals are not present.

4. The method of claim 3, further comprising the step of periodically energizing the de-energized selected components of the speech encoder to update at least some of 'R', 'H', 'I', '$\beta$', '$\gamma_1$', '$\gamma_2$', 'L' and '$r_i$' from an actual signal noise that may be present.

5. The method of claim 1, wherein step (d) comprises the step of de-energizing at least some selected components of a vector-sum excited linear predicative coding VSELP speech encoder of the digital signal processor.

6. The method of claim 5, wherein one of the digital signal processor or a microprocessor of the radio transceiver are pre-programmed to de-energize the at least some selected components of the VSELP speech encoder when transmitting the artificial noise signal.

7. The method of claim 5, wherein one of the digital parameter codes is a frame energy and wherein step (b) comprises the steps of:
   estimating a level of background noise when the analog speech signals are present; and
   setting the frame energy to the estimated level of background noise for transmitting the artificial noise signal.

8. The method of claim 1, wherein the digital parameter codes comprise a set of excitation codewords and wherein step (b) comprises the step of randomly selecting each of the excitation codewords from at least one codebook of a speech encoder for transmitting the artificial noise signal.

9. The method of claim 1, wherein the digital parameter codes comprise a set of excitation gains, a set of pitch predictor lag parameters, and a set of linear predictive coding coefficients, and wherein step (b) comprises the step of setting each of the excitation gains, pitch predictor lag parameters, and linear predictive coding coefficients to respective constant values estimated from the noise signals.

10. The method of claim 1, further comprising the step of periodically updating at least some of the digital parameter codes.

11. A battery-powered radio transceiver for transmitting and receiving digital RF signals with improved battery life, comprising:
   an operator interface;
   a transmitter electrically connected to a microphone in said operator interface to convert analog speech signals into the digital RF signals for transmission;
   a receiver electrically connected to a speaker in said operator interface to receive the digital RF signals and to convert the RF digital signals into audio signals from said speaker;
   a microprocessor electrically connected to said operator interface, said transmitter and said receiver;
   an electrical storage battery electrically connected to said microprocessor to supply electrical power to said microprocessor, said operator interface, said transmitter and said receiver, via said microprocessor;
   an antenna assembly for transmitting and receiving the RF digital signals; and
   said transmitter comprising a digital signal processor programmed to de-energize at least some components of said digital signal processor and to generate an artificial noise signal when the analog speech signals are not being received by said microphone, said artificial noise signal being transmitted to a base station to permit the base station to generate a return comfort noise signal.

12. The radio transceiver of claim 11, wherein said digital signals are divided into frames, each frame containing digital parameter codes characteristic of the analog speech signals and analog noise signals received by said microphone and wherein said digital signal processor detects when the analog speech signals are not present and sets each of the digital parameter codes to at least one of determined or selected code values for a predetermined number of frames, said determined or selected digital parameter code values defining said artificial noise signal which is transmitted to a base station when the analog speech signals are not present.

13. The radio transceiver of claim 12, wherein said digital signal processor periodically energizes said at least some components of said digital signal processor which were de-energized to update at least some of said determined or selected parameter code values to generate said artificial noise signal.

14. The radio transceiver of claim 12, wherein the digital parameter codes comprise a frame energy R, a set of excitation codewords H, I, a set of excitation gains $\beta$, $\gamma_1$, $\gamma_2$, a set of pitch predictor lag parameters L, and a set of linear predictive coding LPC coefficients $r_i$, and wherein said digital signal processor is programmed to determine and store a value for 'R', 'H', 'I', '$\beta$', '$\gamma_1$', '$\gamma_2$', 'L' and '$r_i$' from actual noise before de-energizing said at least some components of said digital signal processor and to set 'R', 'H', 'I', '$\beta$', '$\gamma_1$', '$\gamma_2$', 'L' to the values stored to generate said artificial noise signal.

15. The radio transceiver of claim 14, wherein said digital signal processor is programmed to periodically energize said at least some components of said digital signal processor which were de-energized to update at least some of 'R', 'H', 'I', '$\beta$', '$\gamma_1$', '$\gamma_2$', 'L' and '$r_i$' from an actual noise signal that may be present.

16. The radio transceiver of claim 12, wherein said digital parameter codes comprise a set of excitation codewords which are each randomly selected by said digital signal processor from at least one codebook for generating said artificial noise signal.

17. The radio transceiver of claim 12, wherein said digital parameter codes comprise a set of excitation gains, a set of pitch predictor lag parameters, and a set of linear predictive coding coefficients each of which are set to respective constant values by said digital signal processor to generate said artificial noise, said constant values being estimated and stored during a period when actual noise signals are being processed and transmitted by said radio transceiver.

18. A digital signal processor for use in a radio transceiver capable of transmitting and receiving digital signals which are divided into frames, each frame containing digital parameter codes characterizing analog speech signals and analog noise signals, said digital signal processor comprising:

means for determining if the analog speech signals are present;

means for setting each of the digital parameter codes to at least one of determined or selected code values for a predetermined number of frames when the analog speech signals are not present;

means for transmitting the determined or selected parameter code values, defining an artificial noise signal, to a base station when the analog speech signals are not present; and means for de-energizing at least some selected components of the digital signal processor.

19. The digital signal processor of claim 18, further comprising means for periodically energizing the de-energized selected components of the digital signal processor to update at least some of the determined or selected parameter code values.

20. The digital signal processor of claim 18, further comprising a codebook-excited linear prediction CELP coder.

21. A method for reducing electrical power consumption in a radio transceiver capable of transmitting and receiving digital signals which are divided into frames, each frame containing digital parameter codes characterizing analog speech signals and analog noise signals, said method comprising the steps of:

(a) determining if the analog speech signals are present;

(b) setting each of the digital parameter codes to at least one of determined or selected values for a predetermined number of frames when the analog speech signals are not present;

(c) transmitting the determined or selected parameter code values, defining an artificial noise signal, to a base station when the analog speech signals are not present to permit the base station to generate a return comfort noise signal; and;

(d) reducing electrical power supplied to a digital signal processor of the radio transceiver when transmitting the artificial noise signal.

22. A digital signal processor for use in a radio transceiver capable of transmitting and receiving digital signals which are divided into frames, each frame containing digital parameter codes characterizing analog speech signals and analog noise signals, said digital signal processor comprising:

means for determining if speech signals are present;

means for setting each of the digital parameter codes to at least one of determined or selected code values for a predetermined number of frames when the analog speech signals are not present;

means for transmitting the determined or selected parameter code values, defining an artificial noise signal, to a base station when the analog speech signals are not present to permit the base station to generate a return comfort noise signal; and means for de-energizing at least some selected components of the digital signal processor.

* * * * *